United States Patent
Dubois et al.

(10) Patent No.: US 9,249,253 B2
(45) Date of Patent: *Feb. 2, 2016

(54) POLYLACTIDE-URETHANE COPOLYMERS

(75) Inventors: Philippe Dubois, Ciplet (BE); Philippe Coszach, Escanaffles (BE); Gloria Vendrell, Le Havre (FR); Philippe Degee, Battice (BE); Michael Alexandre, Ougree (BE); Ibrahim Barakat, Beersele (BE); Jean Marie Raquez, Mons (BE)

(73) Assignee: FUTERRO S.A., Escanaffles (BE)

( * ) Notice: Subject to any disclaimer, the term of this patent is extended or adjusted under 35 U.S.C. 154(b) by 338 days.

This patent is subject to a terminal disclaimer.

(21) Appl. No.: 12/442,481

(22) PCT Filed: Sep. 27, 2007

(86) PCT No.: PCT/EP2007/060275
§ 371 (c)(1),
(2), (4) Date: Oct. 5, 2009

(87) PCT Pub. No.: WO2008/037773
PCT Pub. Date: Apr. 3, 2008

(65) Prior Publication Data
US 2010/0016538 A1  Jan. 21, 2010

(30) Foreign Application Priority Data
Sep. 29, 2006  (EP) .................... 06121560

(51) Int. Cl.
*C08G 18/42* (2006.01)
*C08G 18/32* (2006.01)
*C08G 18/08* (2006.01)
*C08G 18/10* (2006.01)

(52) U.S. Cl.
CPC ........ *C08G 18/4283* (2013.01); *C08G 18/0895* (2013.01); *C08G 18/10* (2013.01); *C08G 18/3206* (2013.01); *C08G 18/3228* (2013.01); *C08G 18/3231* (2013.01); *C08G 18/428* (2013.01); *C08G 2230/00* (2013.01)

(58) Field of Classification Search
CPC ........... C08G 18/3206; C08G 18/3228; C08G 18/3231; C08G 18/428; C08G 18/4283
USPC ........... 528/59, 61, 62, 63, 64, 80, 83, 84, 85
See application file for complete search history.

(56) References Cited

U.S. PATENT DOCUMENTS

| | | | | |
|---|---|---|---|---|
| 6,087,465 A * | 7/2000 | Seppala et al. | .................... | 528/80 |
| 6,093,270 A * | 7/2000 | Ferencz et al. | .................... | 156/73.5 |
| 6,166,169 A | 12/2000 | Fritz et al. | | |
| 6,372,876 B1 * | 4/2002 | Kim et al. | .................... | 528/71 |
| 6,737,471 B2 * | 5/2004 | Lorenz et al. | .................... | 524/773 |
| 2004/0171767 A1 | 9/2004 | Pohlmann et al. | | |
| 2007/0155906 A1 * | 7/2007 | Hissink | .................... | A61K 9/1647 525/242 |
| 2007/0275033 A9 * | 11/2007 | Moore et al. | .................... | 424/423 |

FOREIGN PATENT DOCUMENTS

| | | | | |
|---|---|---|---|---|
| CN | 1563138 A | 1/2005 | | |
| JP | H04-13710 | 1/1992 | | |
| JP | 08027256 A | 1/1996 | | |
| JP | 11043538 | * 2/1999 | ............. | C08G 63/08 |
| WO | 2004041889 | 5/2004 | | |

OTHER PUBLICATIONS

"Synthesis and properties of liquid crystalline aromatic copolyesters with lactide moieties." Greiner et al. Macrmol. Chem. Phys. 200, No. 9, pp. 2080-2087.*
Dubois, Philippe, et al., U.S. Appl. No. 12/442,478, filed Mar. 23, 2009, "Process for Producing Polylactide-Urethane Copolymers,".
Kobayashi, Hisatoshi, et al., "Water-Curable and Biodegradable Prepolymers," Journal of Biomedical Materials Research, vol. 25, No. 12, 1991, pp. 1481-1494.
Wang, Wenshou, et al. Polyactide-based Polyurethane and its Shape-Memory Behavior, European Polymer Journal 42, 2006, pp. 1240-1249.
Office Action issued in Chinese Application No. 200780036410.X, dated Feb. 28, 2011, 9 pages.
Office Action issued in Chinese Application No. 200780036410.X, dated Sep. 5, 2013, 7 pages.
English Translation of: Riguang Jin, Youqing Hua, et al., "Section 5.2.3 Factors influencing the glass transition temperature and means for adjusting thereof", Polymer Physics, Chemistry Industry Press, Jan. 2001, 2 pages.

* cited by examiner

*Primary Examiner* — Michael L Leonard

(57) ABSTRACT

The process of obtaining a polylactide-urethane copolymer is described which includes contacting an α, ω dihydroxyl polylactide prepolymer of general formula I

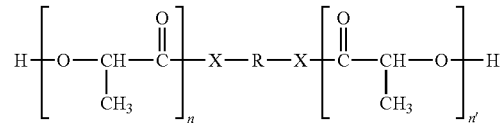

wherein X is NH or O, R is an alkyl or an aryl group, n and n' are integer numbers which are substantially the same and are in the range from 20 to 140, with a diisocyanate compound of general formula II

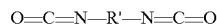

wherein R' is an alkyl or an aryl group and with an amine or an alcohol of general formula III

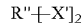

wherein R" is an alkyl or an aryl group and X' is $NH_2$ or OH, and with the proviso that at least one of R or R" is an aryl group.

19 Claims, No Drawings

POLYLACTIDE-URETHANE COPOLYMERS

CROSS-REFERENCE TO RELATED APPLICATIONS

This application is a U.S. National Phase application under 35 U.S.C. §371 of PCT Application No. PCT/EP2007/060275, filed Sep. 27, 2007, which claims priority under 35 U.S.C. §119 (a)-(d) of European Patent Application No. 06121560.4, filed Sep. 29, 2006.

The present invention relates to polylactide-urethane copolymers.

Polylactide (PLA) are well known biodegradable polyesters. Commercial interest for these polymers is increasing in many applications such as in biomedical applications, e.g. medical sutures but also in many other industrial applications such as e.g. fibers or films. However, one drawback of these lactide polymers is that they are brittle at room temperature.

Another drawback is that their low glass transition temperatures of about 55° C. to 60° C. limit their uses to relatively low temperature.

To improve these drawbacks, polylactide-urethane resins have been developed. Nevertheless, the properties of these resins can still be improved.

WO 96/01863 discloses a poly (ester-urethane) resin, which may be prepared from a hydroxyl terminated poly (lactic acid) prepolymer and an aliphatic or an alicylic diisocyanate. The said prepolymer is derived from lactic acid and an aliphatic or an aromatic diol.

The Derwent abstract of JP 04013710 A2 discloses a polyurethane resin obtained by the reaction of a micropolyol, at least part of which contains alphahydroxy acid, and a polyisocyanate, with optionally the addition of a chain elongator. In an example, 1,4-butanediol and lactic acid were mixed and reacted at 150-200° C. for 6 hours to form α, ω diol (Mw=2,000). The diol (0.225 mole), 1,4-butanediol (0.733 mole) and diphenylmethane diisocyanate (0.987 mole) were reacted at 100° C. for 24 hours to obtain polyurethane.

European Polymer Journal 42 (2006), pages 1240-1249, discloses the synthesis of a polylactide-based polyurethane prepared from a hydroxyl-terminated poly (lactide) prepolymer and hexamethylene diisocyanate in the presence of 1,4-butanediol. The said prepolymer is derived from lactide and 1,4-butanediol.

U.S. Pat. No. 6,372,876 discloses the use of polyurethanes which are soluble or dispersible in water and are composed of a) at least one compound which contains two or more active hydrogens per molecule, b) at (east one diol containing acid groups or salt groups and c) at least one diisocyanate with a glass transition temperature of at least 15° C. and acid numbers of from 12 to 150 or the salts of these polyurethanes as aids in cosmetic and pharmaceutical compositions, and of polyurethanes which are soluble or dispersible in water and which contain (a) at least 5 mol % of a polycondensate of lactic acid and of a polyol of the formula Y—[O—(CO—CH (CH3)—O)$_n$—H]$_m$ where Y is a radical derived from a dihydric to tetrahydric alcohol, n is 1-50 and m is 1-4 as copolymerized units.

It is an object of the present invention to provide polylactide-urethane copolymers whose glass transition temperature is increased.

It is another object of the present invention to provide polylactide-urethane copolymers whose mechanical properties are improved.

At least one of these objects is achieved by the invention.

In the present invention, the term polylactide (PLA) refers to a polymer in which the majority of repeating units are lactide-based monomers.

By biodegradable, it is meant that the polylactide-urethane copolymers are susceptible to degradation by microorganisms under natural conditions.

By reactive extrusion, it is meant that the polymerisation of the polylactide-urethane copolymers is carried out in an extruder.

The present invention provides polylactide-urethane copolymers obtainable by a process, which comprises the step of contacting:

an α, ω dihydroxyl polylactide prepolymer of general formula I

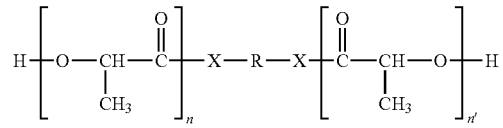

wherein:
X is NH or O,
R is an alkyl or an aryl group,
n and n' are integer numbers which are substantially the same and which are comprised in the range from 20 to 140, a diisocyanate compound of general formula II

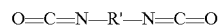

wherein: R' is an alkyl or an aryl group and
an amine or an alcohol of general formula III

wherein: R" is an alkyl or an aryl group and X' is NH$_2$ or OH
with the proviso that at least one of R or R" is an aryl group.

Preferably, the α, ω dihydroxyl PLA prepolymer is obtainable by ring opening polymerisation of the cyclic lactide monomer with a first diol or diamine of formula R—(X—H)$_2$ wherein X is NH or O and R is an alkyl or an aryl group containing from 3 to 20 carbon atoms, preferably from 3 to 13 carbon atoms, more preferably from 6 to 13 carbons. The alkyl or the aryl group may be substituted or not. The alkyl group may be linear, cyclic, saturated or unsaturated. Preferably, R is an aryl group. The diol or the diamine is used as the initiator for the polymerisation of the lactide.

Preferably, the lactide used is a compound formed by the cyclic dimerisation of the lactic acid. The lactide exists in a variety of isomeric forms such as L, L-lactide, D, D-lactide and D, L-lactide. In the present invention, the L, L-lactide is preferably used. Any process may produce the lactide for use in the present invention. A suitable process for preparing the L, L-lactide is for example described in patent application WO 2004/041889.

Among amines that can be used as initiator, one can cite 1,4-butanediamine, 1,6-hexanediamine, 1,4-cyclohexanediamine, 1,4-phenyldiamine, 4,4'-diaminodiphenylmethane. Preferably 1,4-phenyldiamine or 4,4'-diaminodiphenylmethane is used. Most preferably, the 4,4'-diaminodiphenylmethane is used.

Among alcohols that can be used as initiator, one can cite 1,3-propanediol, 1,3-butanediol, 1,4-butanediol, 1,6-hexanediol, 1,7-heptanediol, 1,8-octanediol, xylene glycol. Preferably, xylene glycol is used.

In the general formula I, n and n' are each comprised in the range from 20 to 140, preferably in the range from 35 to 125, more preferably in the range from 45 to 105.

When R, R' and R" are aryl groups, n and n' are each comprised in the range from 20 to 140, preferably in the range from 35 to 140, more preferably in the range from 45 to 140, most preferably around 140.

Alternatively, the α, ω dihydroxyl PLA prepolymer may be characterised by a number average molecular weight (Mn) comprised in the range from 3,000 to 20,000 g/mol, preferably in the range from 5,000 to 18,000 g/mol, more preferably in the range from 7,000 to 15,000 g/mol.

When R, R' and R" are aryl groups, the α, ω dihydroxyl PLA prepolymer may be characterized by a number average molecular weight (Mn) comprised in the range from 3,000 to 20,000 g/mol, preferably in the range from 5,000 to 20,000 g/mol, more preferably in the range from 7,000 to 20,000 g/mol, most preferably around 20,000 g/mol.

The concentration of lactide monomer and of initiator needed for producing the α, ω dihydroxyl PLA prepolymer are determined according to the desired number average molecular weight of said prepolymer. For example, if a desired number average molecular weight of said prepolymer is 14,400 g/mol, the degree of polymerisation is 100 (14,400/144, 144 being the molecular weight of the lactide). Lactide and initiator are added in amounts such that the molar ratio of lactide to initiator is 100 to 1.

The α, ω dihydroxyl PLA prepolymer is then coupled with a diisocyanate compound in the presence of a second diol or diamine called herein "extender" in order to produce polylactide-urethane copolymers.

Preferably, the polylactide-urethane copolymer of the invention is obtained by a process, which comprises the steps of:

1°) mixing α, ω dihydroxyl polylactide prepolymer of general formula I with an amine or an alcohol of general formula III, 2°) contacting the resulting mixture issued from step 1°) with the diisocyanate compound of general formula II.

The diisocyanate compound is of formula O=C=N—R'—N=C=O wherein R' is an alkyl or aryl group containing from 4 to 20 carbon atoms, preferably from 6 to 13 carbon atoms. The alkyl or aryl group may be substituted or not. The alkyl group may be linear, cyclic, saturated or unsaturated. Preferably, R' is an aryl group. As diisocyanate compounds, one can cite the 1,6-hexamethylene diisocyanate (HMDI), the 4,4'-dicyclohexylmethane diisocyanate, the 4,4'-methylene diphenylisocyanate (MDI), the toluene diisocyanate (TDI), the p-phenylene diisocyanate. Preferably, the 4,4'-methylene diphenylisocyanate is used. The amount of diisocyanate to be added is such that the molar ratio between the isocyanate groups of the diisocyanate and the hydroxyl groups of the PLA prepolymer plus the functional groups (OH or NH$_2$) of the extender is from 1 to 1.6 preferably from 1.2 to 1.4.

The extender is of formula R"—(X')$_2$ wherein X' is NH$_2$ or OH and R" is an alkyl or an aryl group containing from 3 to 20 carbon atoms, preferably from 6 to 13 carbon atoms. The alkyl group or the aryl group may be substituted or not. Preferably, R" is an aryl group. The amount of extender to be added is such that the molar ratio between the α, ω dihydroxyl terminated PLA prepolymer and the extender is in the range from 40/60 to 75/25, preferably around 60/40. Among amines that that can be used as extender, one can cite 1,4-butanediamine, 1,6-hexanediamine, 1,4-cyclohexanediamine, 1,4-phenyldiamine, 4,4'-diaminodiphenylmethane. Preferably 1,4-phenyldiamine or 4,4'-diaminodiphenylmethane is used. Most preferably, the 4,4'-diaminodiphenylmethane is used.

Among alcohols that can be used as extender, one can cite 1,3-propanediol, 1,3-butanediol, 1,4-butanediol, 1,6-hexanediol, 1,7-heptanediol, 1,8-octanediol, xylene glycol. Preferably, xylene glycol is used.

According to one embodiment, R' is an alkyl group and at least one of R or R" is an aryl group, preferably R is an aryl group and R" is an alkyl group or R is an alkyl group and R" is an aryl group.

According to another embodiment, R' and at least one of R or R" are aryl groups, preferably R is an aryl group and R" is an alkyl group or R is an alkyl group and R" is an aryl group or R, R' and R" are aryl groups.

By selecting at least one aryl group as R or R", the glass transition temperature of the polylactide-urethane copolymer is improved regarding that of the PLA homopolymer. The rigidity of the polylactide-urethane copolymer is generally improved by using an extender, particularly when R" is an aryl group.

The prepolymerisation of the dihydroxyl-PLA and the polymerisation of the polylactide-urethane resin may be carried out with any suitable catalyst system. The catalyst system may contain at least one catalyst component of the formula:

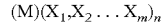

wherein

M is a metal selected from groups 3-12 of the periodic system and from the elements Al, Ga, In, Tl, Sn, Pb, Sb and Bi, (Xm) is a substituent selected from one of the compound classes of alkyls, aryls, oxides, carboxylates, halogenides, and alkoxides and compounds containing elements from group 15 and/or 16 of the periodic system, m is a whole number ranging from 1 to 6, n is a whole number ranging from 0 to 6;

and at least one co-catalyst of the formula 

wherein Y is an element selected from group 15 or 16 of the periodic system, $(R_1, R_2 \ldots R_q)$ is a substituent selected from one of the compound classes of alkyls, aryls, oxides, halogenides, oxyalkyls, aminoalkyls, thioalkyls, phenoxides, aminoaryls, thioaryls, q is a whole number ranging from 1 to 6, and p is a whole number ranging from 0 to 6.

As catalyst system, one can cite the combination of Sn-bis (2-ethylhexanoate) catalyst and triphenylphosphine (P(Ph)$_3$) co-catalyst. Such a catalyst system is well known and fully described in U.S. Pat. No. 6,166,169.

The molar ratio of the co-catalyst to the catalyst may range from 1/10 to 10/1, preferably from 1/3 to 3/1. An equimolar ratio between the co-catalyst and the catalyst is particularly preferable.

The molar ratio of the lactide monomer to the catalyst and co-catalyst may range from 200/1 to 10,000/1, preferably from 1,000/1 to 7,500/1, more preferably from 1,750/1 to 5,250/1. According to a preferred embodiment the molar ratio of the lactide monomer to the catalyst and co-catalyst is about 5000/1.

The prepolymerisation and the polymerisation are both carried out as a bulk process (without any solvent) in a molten state under dry inert gas atmosphere such as e.g. argon or nitrogen at a temperature of around 160° C. Preferably, the polylactide-urethane copolymers of the invention have a number weight average molecular weight (Mn) of at least 25,0000 g/mol, preferably at least 50,000 g/mol, more preferably at least 80,000 g/mol and a molecular weight distribution (Mw/Mn) represented by a ratio of a weight average molecular weight (Mw) to a number average molecular weight (Mn) comprised in the range from 1.2 to 3.5.

The polylactide-urethane copolymers of the invention have a higher glass transition temperature than that of the polylactide homopolymers.

The invention further provides polylactide-urethane copolymers characterised by a storage modulus higher than 2500 MPa, preferably higher than 2800 MPa, more preferably higher than 3200 MPa, yet more preferably higher than 3700 MPa when measured at 0° C. according to ASTM D 5418-01 at a frequency of 1 Hz and an amplitude of 20 microns.

EXAMPLES

In the examples, the average molecular weight by weight (Mw) and the average molecular weight by number (Mn) are determined by gel permeation chromatography with respect to polystyrene standards or by NMR.

The storage modulus of the polylactide-urethane copolymers is determined by dynamical mechanical thermal analysis (DMTA) according to ASTM D 5418-01 at a frequency of 1 Hz and amplitude of 20 microns. The samples are first cooled to −40° C. and then subsequently heated at a rate of 3° C./min to 140° C. The storage modulus is measured at 0° C.

The glass transition temperature (Tg) may be determined by DMTA according to ASTM D 5418-01 as described in the previous paragraph. The samples are heated at a rate of 3° C./min. As glass transition temperature is taken the temperature at the maximum of the loss modulus.

The glass transition temperature may be also determined by differential scanning calorimetry (DSC) according to ISO 11357-2. In this method, the samples are heated and cooled either once (Tg $1^{st}$ cycle) or twice (Tg $2^{nd}$ cycle). The first heating takes place from 20° C. to 190° C., the cooling take place from 190° C. to 20° C. and the second heating takes place from 20° C. to 190° C. The first heating, the cooling and the second heating rates are at 10° C./min.

The crystallisation temperature (Tc) and the melting temperature (Tm) are determined according to DSC (ISO 11357-2).

In tables 2 to 7, (ΔH J/g) and "n.d" respectively means "enthalpy" and "not determined".

The values of n and n' have been determined based on the Mn of the polylactide prepolymer.

1. Synthesis of the (L,L) Lactide Dihydroxyl Prepolymer

The (L,L) lactide dihydroxyl prepolymer was produced by using as initiator, either 1,4 butanediol or 4,4'diaminodiphenylmethane.

The L, L-lactide monomer provided by the company "Galactic" and characterised by a L-lactide content of 99.7% mol was introduced into a 400-cm³-glass reactor at room temperature. The reactor was degassed with vacuum/nitrogen fill cycles. The alcohol or the diamine was further added in solution to the reactor. The solvent was then removed by vacuum at 45° C. and the temperature was raised to 160° C. under stirring at 50 rpm. When the L, L-lactide monomer was melted, Sn-bis(2-ethylhexanoate) and triphenylphosphine were added in an equimolar ratio under stirring to the reactor. The molar ratio of the lactide monomer to the catalyst and cocatalyst was 1/5000. The polymerisation took place at about 160° C.

1-1 Synthesis of the Polylactide (PLA)-1,4 Butanediol Prepolymer

The L, L-lactide monomer was introduced into the glass reactor. The 1,4-butanediol was further added to the reactor such that the molar ratio of the lactide to the 1,4-butanediol was of 102. The other operations conditions are those described in the previous paragraph. The polymerisation took place during 30 minutes at about 160° C.

The PLA-1,4 butanediol prepolymer is characterised by an average molecular weight by number (Mn) of 14,800 g/mol when determined by NMR, a glass transition temperature of 51° C. (ISO 11357-2, $2^{nd}$ cycle), and a n and n' each of about 102.

1.2 Synthesis of the Polylactide (PLA)-4,4' diaminodiphenylmethane Prepolymer

In this case, the synthesis of the L, L-lactide prepolymer was carried out with 4,4' diaminodiphenylmethane under the same operation conditions as those described under point 1. The molar ratio of the lactide to the 4,4' diaminodiphenylmethane was 85. The polymerisation took place during 50 min at about 160° C.

The PLA-4,4' diaminodiphenylmethane prepolymer is characterised by an average molecular weight by number (Mn) of 12,400 g/mol when determined by NMR, a n and n' each of about 86 and a glass transition temperature of 51° C. (ISO 11357-2, $2^{nd}$ cycle).

2. Synthesis of the Polylactide-Urethane Copolymers

The synthesis of the polylactide-urethane copolymers was performed in an extruder (Termo-Haakek, double conical screw having a length of 109.5 mm, a screw diameter of 5 mm at the top and of 14 mm at the opposite side, volume 7 cm³, in co-rotation mode).

The α, ω dihydroxyl terminated PLA prepolymer such as prepared either under 1.1 or 1.2 was fed into a flask to which was first mixed the extender before contacting the resulting mixture with the diisocyanate. The introduction of the mixture in the extruder was made under stirring at a speed of 30 rpm during about 2 min. The speed of stirring was then increased to 70 rpm. The polymerisation in the extruder took place at 160° C. during 5 minutes in the presence of the catalyst system in quantity as defined under point 1. The diisocyanate compound was added in such a quantity that the molar ratio between the isocyanate groups of the diisocyanate and the hydroxyl groups of the polylactide prepolymer plus the amino groups of the extender was 1. The extender was added in such a quantity that the molar ratio of the dihydroxyl PLA prepolymer to the extender was 40:60.

2.1 Synthesis of the 1,4 Butanediol Polylactide Urethane Copolymers

The synthesis of the 1,4 butanediol polylactide urethane copolymers occurred under operation conditions as described in the previous paragraph.

As diisocyanate compounds, were tested:
1,6-hexamethylene diisocyanate (HMDI) and
4,4'-methylene diphenylisocyanate (MDI).

As extenders, were tested:
1,6-hexanediamine (HDA),
4,4'-diaminodiphenylmethane (MDA).

The results are displayed in table 1.

TABLE 1

| PLA-urethane copolymers | Composition Diisocyanate | Composition Extender | Mn $10^3$ g/mol | Mw/Mn | DSC $T_g$(° C.) $1^{st}$ cycle | DSC $T_g$(° C.) $2^{nd}$ cycle | $T_g$ (° C.) | DMTA Storage modulus (Mpa) |
|---|---|---|---|---|---|---|---|---|
| IBBA103a (comp.) | HMDI | HDA | 58.9 | 2.7 | 52 | 58 | 60 | 2,890 |
| IBBA113 | HMDI | MDA | 52.50 | 3.30 | 60 | 60 | 69 | 2,965 |
| IBBA 106 | MDI | HDA | 20.20 | 1.90 | 53 | 60 | 68 | 3,888 |
| IBBA 114 | MDI | MDA | n.m | n.m | n.d | 63 | 76 | 3,590 |
| PLA 106K (comp) | none | none | 106 | 1.98 | n.d | 62 | 65 | 3,353 | n.m: not measurable because the polymers are insoluble in tetrahydrofuran.
n.d: not detected One can see that the glass transition temperature of the polylactide-urethane copolymers according to the invention is increased by using an organic type extender (MDA). Moreover, by using an organic type diisocyanate compound (MDI) and an organic type extender (MDA), the glass transition temperature is still more increased. The glass transition temperature of the polylactide-urethane copolymers according to the invention is higher than that of the comparative polylactide homopolymers identified as PLA 106K, provided by the company "Galactic" characterised by a Mn of 106,000 g/mol and a Mw/Mn of 1.98.

2.2 Synthesis of the 4,4'Diaminodiphenylmethane Polylactide Urethane Copolymers

The synthesis of the 4,4' diaminodiphenylmethane urethane copolymers occurred under operation conditions as described under point 2.

As diisocyanate compounds, were tested:
1,6-hexamethylene diisocyanate (HMDI) and
4,4'-methylene diphenylisocyanate (MDI).

As extenders, were tested:
1,6-hexanediamine (HDA),
4,4'-diaminodiphenylmethane (MDA) and
p-xylene glycol (Ardiol)

The results are displayed in tables 2 and 3

TABLE 2

| PLA-urethane copolymers | Composition | DSC $1^{st}$ cycle Tg ° C. | DSC $1^{st}$ cycle Tc ° C. (ΔHJ/g) | DSC $1^{st}$ cycle Tm ° C. (ΔHJ/g) | DSC $2^{nd}$ cycle Tg ° C. | DSC $2^{nd}$ cycle Tc ° C. (ΔH J/g) | DSC $2^{nd}$ cycle Tm ° C. (ΔH J/g) | DMTA Tg ° C. | DMTA Storage modulus (MPa) |
|---|---|---|---|---|---|---|---|---|---|
| Cede68b | HMDI/HDA | n.d | n.d | 145 (32) | 64 | 124 (21) | 145 (24) | 77 | 3,500 |
| Cede68a | HMDI/MDA | 65 | n.d | 139 (26) | 64 | n.d | 145 (1) | 74 | 4,145 |
| Ibba127a | HMDI/Ardiol | 58 | n.d | 145 (34) | 60 | n.d | 144 (1) | 67 | 2,957 |
| PLA106K (comp) | None | n.d | n.d | n.d | 62 | n.d | n.d | 65 | 3,353 |

TABLE 3

| PLA-urethane copolymers | Composition | DSC $2^{nd}$ cycle Tg ° C. | DSC $2^{nd}$ cycle Tc° C. (ΔH J/g) | DSC $2^{nd}$ cycle Tm° C. (ΔH J/g) | DMTA Tg ° C. | DMTA Storage modulus (MPa) |
|---|---|---|---|---|---|---|
| Cede69c | MDI/HDA | 68 | n.d | 149 (2) | 73 | 3,238 |
| Cede69e | MDI/MDA | 67 | n.d | 144 (1) | 69 | 3,345 |
| Ibba127b | MDI/Ardiol | 69 | n.d | 146 (1) | 73 | 3,573 |
| PLA 106K (comp) | None | 62 | n.d | n.d | 65 | 3,353 |

Further synthesis trials of 4,4' diaminodiphenylmethane polylactide urethane copolymers were conducted by varying the average molecular weight by number (Mn) of the dihydroxyl PLA prepolymer. The syntheses were conducted under the operation conditions as described under point 2.

As diisocyanate compounds, were tested:

1,6-hexamethylene diisocyanate (HMDI) and 4,4'-methylene diphenylisocyanate (MDI).

As extenders, were tested:

1,6-hexanediamine (HDA) and 4,4'-diaminodiphenylmethane (MDA)

The results are displayed in tables 4 to 7.

TABLE 4

| PLA-urethane copolymers | Composition | n,n' (PLA) | Mn (PLA) | Tg ° C. | DSC 2nd cycle Tc ° C. (ΔH J/g) | Tm ° C. (ΔH J/g) | DMTA Tg ° C. | Storage modulus (MPa) |
|---|---|---|---|---|---|---|---|---|
| Ceded69a | HMDI/HDA | 46 | 6,700 | 65 | n.d | n.d | 71 | 3,422 |
| Ibba115b | HMDI/HDA | 68 | 9,900 | 65 | n.d | 145 (1) | 76 | 3,311 |
| Ceded68b | HMDI/HDA | 86 | 12,400 | 64 | 124 (21) | 145 (24) | 77 | 3,500 |
| Ibba126a | HMDI/HDA | 132 | 19,100 | 63 | 121 (25) | 155 (30) | 67 | 3,244 |
| PLA 106K (comp) | none | n.d | 106,000 | 62 | n.d | n.d | 65 | 3,353 |

TABLE 5

| PLA-urethane copolymers | Composition | n,n' (PLA) | Mn (PLA) | Tg ° C. | DSC 2nd cycle Tc ° C. (ΔH J/g) | Tm ° C. (ΔH J/g) | DMTA Tg ° C. | Storage modulus (MPa) |
|---|---|---|---|---|---|---|---|---|
| Ceded69b | HMDI/MDA | 46 | 6,700 | nd | nd | nd | 69 | 3,047 |
| Ibba115a | HMDI/MDA | 68 | 9,900 | 66 | 132 (3) | 146 (3) | 71 | 3,120 |
| Ceded68a | HMDI/MDA | 86 | 12,400 | 64 | n.d | 145 (1) | 74 | 4,145 |
| Ibba126b | HMDI/MDA | 132 | 19,100 | 64 | 119 (28) | 154 | 72 | 3,829 |
| PLA 106K (comp) | none | n.d | 106,000 | 62 | n.d | n.d | 65 | 3,353 |

TABLE 6

| PLA-urethane copolymers | Composition | n,n' (PLA) | Mn (PLA) | Tg ° C. | DSC 2nd cycle Tc ° C. (ΔH J/g) | Tm ° C. (ΔH J/g) | DMTA Tg ° C. | Storage modulus (MPa) |
|---|---|---|---|---|---|---|---|---|
| Ibba124b | MDI/HDA | 46 | 6,700 | 75 | n.d | n.d | 76 | 2,934 |
| IBBA 116a | MDI/HDA | 68 | 9,900 | 69 | n.d | n.d | 76 | 3,495 |
| Ceded69c | MDI/HDA | 86 | 12,400 | 68 | n.d | 149 (2) | 73 | 3,238 |
| Ibba126c | MDI/HDA | 132 | 19,100 | 65 | 125 (33) | 156 | 70 | 3,658 |
| PLA 106K (comp) | none | n.d | 106,000 | 62 | n.d | n.d | 65 | 3,353 |

TABLE 7

| PLA-urethane copolymers | Composition | n,n' (PLA) | Mn (PLA) | Tg ° C. | DSC 2nd cycle Tc ° C. (ΔH J/g) | Tm ° C. (ΔH J/g) | DMTA Tg ° C. | Storage modulus (MPa) |
|---|---|---|---|---|---|---|---|---|
| Ibba124c | MDI/MDA | 46 | 6,700 | 72 | n.d | n.d | 76 | 2,826 |
| IBBA 116b | MDI/MDA | 68 | 9,900 | 69 | n.d | n.d | 74 | 2,670 |
| Cede69e | MDI/MDA | 86 | 12,400 | 67 | n.d | 144 (1) | 69 | 3,345 |
| Ibba126d | MDI/MDA | 132 | 19,100 | 66 | 125 (23) | 150 (22) | 84 | 3,951 |
| PLA 106k | None | n.d | 106,000 | 62 | n.d | n.d | 65 | 3,353 |

The invention claimed is:

1. A process comprising:

contacting an α, ω dihydroxyl polylactide prepolymer, a diisocyanate compound, and an extender, and carrying out polymerization of the α, ω dihydroxyl polylactide prepolymer, the diisocyanate compound, and the extender in a bulk process in a molten state to obtain a polylactide-urethane copolymer;

wherein the α, ω dihydroxyl polylactide prepolymer is of general formula I:

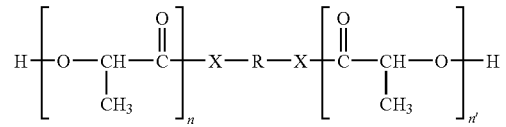

wherein in general formula I: X is NH or O, R is an aryl group, n and n' are integer numbers which are substantially the same and which range from 20 to 140;

wherein the diisocyanate compound is of general formula II:

O=C=N—R'—N=C=O wherein in general formula II: R' is an aryl group; and wherein the extender is an amine or an alcohol of general formula III:

R"—[—X']₂ wherein in general formula III: R" is an aryl group and X' is NH₂ or OH;

and wherein the polylactide-urethane copolymer has a storage modulus that is higher than 2,800 MPa when measured at 0° C. according to ASTM D5418-01 at a frequency of 1 Hz and an amplitude of 20 microns.

2. The process of claim 1, further comprising carrying out ring opening polymerization of a cyclic lactide monomer with a diol or diamine of formula R—(X—H)₂, wherein X is NH or O, wherein R is an aryl group containing from 3 to 20 carbon atoms to obtain the α, ω dihydroxyl polylactide prepolymer.

3. The process of claim 2, wherein the α, ω dihydroxyl polylactide prepolymer is polymerized in the presence of a catalyst system containing:

a catalyst component of the formula:

(M)(X₁,X₂...Xₘ)ₙ wherein M is a metal selected from groups 3-12 of the periodic table and from the elements Al, Ga, In, Tl, Sn, Pb, Sb and Bi;

wherein each X is a substituent selected from alkyls, aryls, oxides, carboxylates, halogenides, and alkoxides and compounds containing elements from group 15 and/or 16 of the periodic table, wherein m is a whole number ranging from 1 to 6, and wherein n is a whole number ranging from 0 to 6; and a co-catalyst of the formula:

(Y)(R₁,R₂...R_q)ₚ wherein Y is an element selected from group 15 or 16 of the periodic table;

wherein each R is selected from alkyls, aryls, oxides, halogenides, oxyalkyls, aminoalkyls, thioalkyls, phenoxides, aminoaryls, and thioaryls, wherein q is a whole number ranging from 1 to 6, and wherein p is a whole number ranging from 0 to 6;

wherein a molar ratio of the co-catalyst to the catalyst component ranges from 1/10 to 10/1, and wherein a molar ratio of the cyclic lactide monomer to the catalyst component and the co-catalyst ranges from 200/1 to 10,000/1.

4. The process of claim 2, further comprising carrying out cyclic dimerization of lactic acid to obtain the cyclic lactide monomer.

5. The process of claim 1, wherein the bulk process is carried out under a dry inert gas atmosphere.

6. The process of claim 1, wherein the bulk process in the molten state comprises reactive extruding the α, ω dihydroxyl polylactide prepolymer, the diisocyanate compound, and the extender in an extruder.

7. The process of claim 1, wherein a molar ratio of isocyanate groups of the diisocyanate compound to hydroxy groups of the α, ω dihydroxyl polylactide prepolymer plus functional groups of the amine or the alcohol ranges from 1 to 1.6.

8. The process of claim 1, wherein a molar ratio of isocyanate groups of the diisocyanate compound to hydroxy groups of the α, ω dihydroxyl polylactide prepolymer plus functional groups of the amine (NH₂) or the alcohol (OH) ranges from 1.2 to 1.4.

9. The process of claim 1, wherein a molar ratio of the α, ω dihydroxyl polylactide prepolymer to the extender ranges from 40/60 to 75/25.

10. The process of claim 1, wherein the polylactide-urethane copolymer has a number average molecular weight of at least 25,000 g/mol.

11. The process of claim 1, wherein the polylactide-urethane copolymer has a molecular weight distribution of represented by a ratio of weight average molecular weight to number average molecular weight ranging from 1.2 to 3.5.

12. The process of claim 1, wherein the polylactide-urethane copolymer has a storage modulus that is higher than 3,200 MPa when measured at 0° C. according to ASTM D5418-01 at a frequency of 1 Hz and an amplitude of 20 microns.

13. The process of claim 1, wherein the α, ω dihydroxyl polylactide prepolymer has a number average molecular weight of form 3,000 to 20,000 g/mol.

14. The process of claim 1, wherein R' contains form 4 to 20 carbon atoms, and wherein R' is substituted or is not substituted.

15. The process of claim 1, wherein the diisocyanate compound is selected from the group consisting of 4,4'-methylene diphenylisocyanate (MDI); toluene diisocyanate (TDI); and p-phenylene diisocyanate.

16. The process of claim 1, wherein R" contains from 3 to 20 carbon atoms, and wherein R" is substituted or is not substituted.

17. The process of claim 1, wherein the extender is an amine.

18. The process of claim 1, wherein the extender is an alcohol.

19. The process of claim 1, wherein the polylactide-urethane copolymer is polymerized in the presence of a catalyst system containing:

a catalyst component of the formula:

(M)(X₁,X₂...Xₘ)ₙ wherein M is a metal selected from groups 3-12 of the periodic table and from the elements Al, Ga, In, Tl, Sn, Pb, Sb and Bi;

wherein each X is a substituent selected from alkyls, aryls, oxides, carboxylates, halogenides, and alkoxides and compounds containing elements from group 15 and/or 16 of the periodic table, wherein m is a whole number ranging from 1 to 6, and wherein n is a whole number ranging from 0 to 6; and a co-catalyst of the formula:

(Y)(R₁,R₂...R_q)ₚ wherein Y is an element selected from group 15 or 16 of the periodic table;

wherein each R is selected from alkyls, aryls, oxides, halogenides, oxyalkyls, aminoalkyls, thioalkyls, phenoxides, aminoaryls, and thioaryls, wherein q is a whole number ranging from 1 to 6, and wherein p is a whole number ranging from 0 to 6;

wherein a molar ratio of the co-catalyst to the catalyst component ranges from 1/10 to 10/1.

* * * * *